July 28, 1931.    A. STORM    1,816,061
TESTING DEVICE FOR CYLINDERS
Filed April 7, 1928
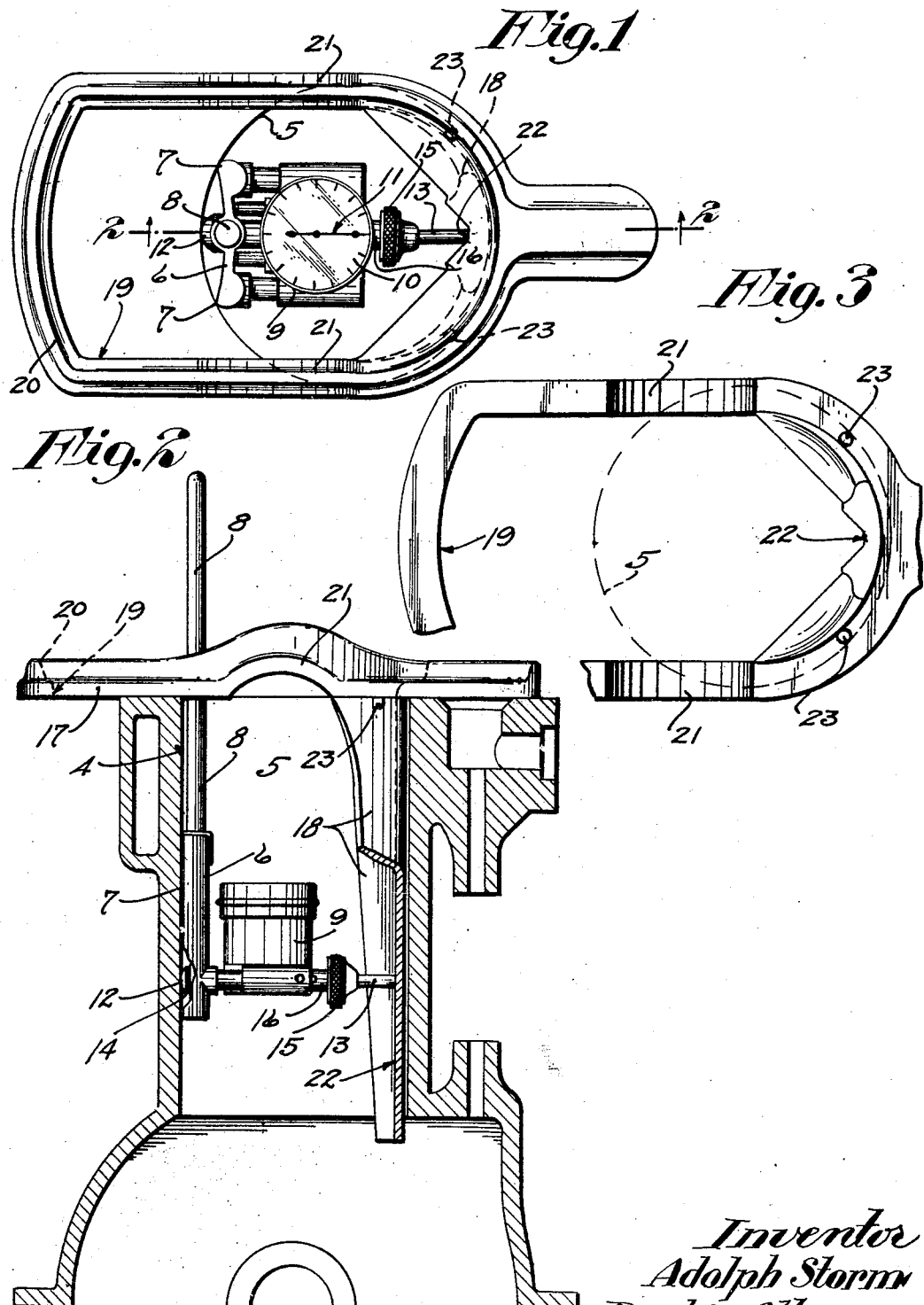
Inventor
Adolph Storm
By his Attorneys Patented July 28, 1931

1,816,061

UNITED STATES PATENT OFFICE

ADOLPH STORM, OF MINNEAPOLIS, MINNESOTA, ASSIGNOR TO STORM MANUFACTURING CO., INC., OF MINNEAPOLIS, MINNESOTA, A CORPORATION OF MINNESOTA

TESTING DEVICE FOR CYLINDERS

Application filed April 7, 1928. Serial No. 268,179.

My invention relates to a testing device for cylinders and, more especially, engine cylinders. Cylinder gauges are in common use for indicating tapered, out of round or scored cylinders, but they will not indicate whether or not the walls of a cylinder are at right angles to the plane of the top of a cylinder block. This testing of a cylinder wall is highly important in order to determine the size to regrind or rebore a cylinder with its axis at right angles to the plane of the cylinder block.

The invention provides a square for use in connection with a cylinder gauge to cause the same to indicate whether or not the walls of a cylinder are at right angles to the plane of the top of the cylinder block, and if out of true, to indicate the same in thousandths or other graduations either minus or plus. In testing a cylinder, the readings are taken longitudinally thereof at a plurality of circumferentially spaced points. After these readings have been noted, it is an easy matter to determine the size to which a cylinder must be reground or rebored to make the same true and with its axis at right angles to the top of the cylinder block.

To the above end, generally stated, the invention consists of the novel construction and arrangement of parts hereinafter described and defined in the claims.

In the accompanying drawings, which illustrate the invention, like characters indicate like parts throughout the several views.

Referring to the drawings:

Fig. 1 is a fragmentary plan view showing a cylinder block and one of its cylinders to which is applied the square and a co-operating cylinder gauge;

Fig. 2 is a view partly in side elevation and partly in section taken on the line 2—2 of Fig. 1; and Fig. 3 is a fragmentary bottom plan view of the square with some parts broken away, and also diametrically illustrating, by means of broken lines, the cylinder shown in Figs. 1 and 2.

The numeral 4 indicates an engine cylinder block and the numeral 5 indicates one of the cylinders thereof.

The cylinder gauge illustrated may be purchased on the market and the operation thereof is well understood. Of the parts of the cylinder gauge it is important to note the sled 6 having two contact points 7, handle 8, block 9 mounted on the sled 6 to move at right angles thereto, dial 10 and co-operating hand 11, contact stud 12, and adjustable rod 13 on the block 9. The dial 10 may be turned on the block 9 to bring its zero mark to any point in relation to the hand 11. The contact stud 12 projects radially from the block 9 and works through a seat therefor in the sled 6 between the contact points 7. Said block 9 has a double spring action making the same self-centering. A stop flange 14 on the contact stud 12 is arranged to engage the sled 6 and limit the movement of the block 9 away from the contact point 7 thereof. The rod 13 is axially aligned with the contact stud 12 and is held in different axial adjustments in respect thereto by a nut 15 applied to a split yieldingly projected stem 16 in the block 9.

Referring now in detail to the invention, the square comprises an elongated head 17 and a blade 18 perpendicular thereto. Said head 17 has a large central work opening 19 and the under face of said head is flat and smooth and on the top thereof is a re-inforcing rib 20. The head 17 is adapted to rest on the top of the cylinder block 4, span the cylinder 5 with the work opening 19 thereover. The two side members of the head 17 are arched at 21 to afford finger holes by which the square may be lifted to and from the cylinder block 4.

The blade 18 is perpendicular to the under or cylinder-block-engaging face of the head 17, is integrally formed with said head at one end thereof and of such length as to extend through the cylinder 5. Said blade 18, in cross section, is in the form of a channel having a narrow bottom with diverging sides that progressively decrease from the head 17. The narrow bottom of the channel in the blade 18 affords a flat way 22 for the rod 13 of the cylinder gauge, and which way extends at right angles to the under or cylinder-block-engaging face of the head 17.

The back of the blade 18 in cross section is on a curve, the diameter of which is substantially the same as that of the cylinder 5. A pair of circumferentially spaced contact pins 23, on the under side of the head 17, at the back of the blade 18, are arranged to engage the walls of the cylinder 5 and hold said blade spaced therefrom.

To test the cylinder 5 to determine whether or not its walls are at right angles to the top of the cylinder block 4, the head 17 is laid on the top of said block with the blade 18 extending into the cylinder 5 with the two contact pins 23 engaging the walls of said cylinder. The cylinder gauge is then inserted through the work opening 19 and into the cylinder 5 and its rod 13 endwise adjusted in respect to the contact stud 12, so that the outer end of said rod engages the way 22 perpendicular thereto and the contact stud 12 engages the wall of the cylinder 5 at a diametrically opposite point from the way 22. The contact points 7 of the sled 6 are yieldingly held in engagement with the walls of the cylinder 5, one on each side of the contact stud 12. The operator then turns the dial 10 to bring its zero point into registration with the hand 11.

With the cylinder gauge thus adjusted the rod 13 is endwise yieldingly pressed against the way 22 and the sled 6 yieldingly pressed from said way into contact with the walls of the cylinder 5. With the cylinder gauge thus mounted, the operator moves the sled 6 longitudinally in the cylinder 5 by means of the handle 8. In case the wall of the cylinder 5 is out of true, either minus or plus, the sled 6 will move either toward or from the block 9 and thereby operate the hand 11 and indicate the number of thousandths the wall is out of true either minus or plus. After the necessary readings have been taken, the operator turns the square and cylinder gauge circumferentially in the cylinder 5 and takes further readings. It is usually customary to test cylinders on quarters in determining the size they are to be reground or rebored.

The above described square, while extremely simple and of small cost of manufacture, has, in actual usage, proven highly efficient for the purpose had in view.

What I claim is:

1. A device of the class described including a head having a positioning face arranged to engage a cylinder block at the top thereof and loosely support the device thereon, said head being provided with a long fixed flat way perpendicular to said face and arranged to extend into one of the cylinders of said block, said device also having a pair of positioning contacts arranged to engage the wall of the cylinder at circumferentially spaced points and position the device with the plane which is perpendicular to and bisects its way, including the axis of said cylinder.

2. The structure defined in claim 1 in which the head is provided with a work opening having a width greater than that between the way and the diametrically opposite side of the cylinder.

3. A device of the class described including a head having a central work opening and a positioning face surrounding said opening and arranged to engage a cylinder block at the top thereof and over one of its cylinders, said head being provided with a flat way perpendicular to said face and arranged to extend into said cylinder, said device also having a pair of positioning contacts arranged to engage the wall of the cylinder at circumferentially spaced points and position the device with the plane which is perpendicular to and bisects its way, including the axis of said cylinder.

In testimony whereof I affix my signature.

ADOLPH STORM.